(12) United States Patent
Saito

(10) Patent No.: US 6,782,008 B2
(45) Date of Patent: Aug. 24, 2004

(54) CONTROL SIGNAL TRANSMISSION TIMING CONTROL IN RADIO COMMUNICATION SYSTEM

(75) Inventor: Naritoshi Saito, Hino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 778 days.

(21) Appl. No.: 09/752,459

(22) Filed: Jan. 3, 2001

(65) Prior Publication Data

US 2001/0007553 A1 Jul. 12, 2001

(30) Foreign Application Priority Data

Jan. 6, 2000 (JP) ........................................ 2000-005741

(51) Int. Cl.[7] .................................................. H04J 3/06
(52) U.S. Cl. ........................ 370/514; 370/342; 375/350
(58) Field of Search ................................ 370/442, 337, 370/503, 342, 441, 509, 514; 455/422; 375/202, 346, 347, 350; 379/57

(56) References Cited

U.S. PATENT DOCUMENTS 5,541,976 A * 7/1996 Ghisler .................... 455/426.1
6,018,555 A * 1/2000 Mahany ...................... 375/347

OTHER PUBLICATIONS

Mahany, "Preamble Modification for Improved Selection Diversity", IEEE, 13 Pages, May 1994.*

* cited by examiner

*Primary Examiner*—John Pezzlo
(74) *Attorney, Agent, or Firm*—Finnegan, Henderson, Farabow, Garrett & Dunner, L.L.P.

(57) ABSTRACT

Transmission timing of the control signal is controlled such that each transmission timing differs between at least adjacent base stations. Thus, the mobile station can reproduce the control signal using only a predetermined spreading signal for the base station which transmits the control single. Therefore the time for reproducing process of the control signal can be reduced.

15 Claims, 4 Drawing Sheets

CONTROL SIGNAL TRANSMISSION TIMING CONTROL IN RADIO COMMUNICATION SYSTEM

CROSS-REFERENCE TO RELATED APPLICATIONS

This application is based upon and claims the benefit of priority from the prior Japanese Patent Application No. 2000-005741, filed Jan. 6, 2000, the entire contents of which are incorporated herein by reference.

BACKGROUND OF THE INVENTION

The present invention relates to a radio communication system such as a CDMA (code division multiple access) system, and more particularly, to transmission timing control of a control signal transmitted from a base station to mobile stations to establish synchronization between the base station and the mobile station.

In a CDMA system, in order to perform a simultaneous communication by a plurality of mobile stations, communication signals for the plural mobile stations are multiplexed by being spectrum-spread using a plurality of spreading signals. Each mobile station is assigned with its corresponding spreading signal. When a mobile station is communicating with a base station, the mobile station checks a quality of the control signal from adjacent base stations to prepare "handover". Each base station periodically transmits the control signal. The transmission timing of the control signal is selected among a plurality of slot timings. The control signal is also called a pilot signal.

When the mobile station receives the control signal from the base station, a first code (which is not spread) formed of a predetermined bit pattern and located at the head end of the control signal, as shown in FIG. 1, is first detected by a matched filter. The matched filter compares the received signal with the predetermined bit pattern. Since the control signal is periodically transmitted from the base station, each mobile station is informed of slot timings for transmission of the control signal by the base station, and detects the first code within the time of $\pm 31\,\mu S$ from each of the slot timings.

After the first code (a start of the control signal) is detected and synchronization between the base station and the mobile station is established, the remaining portion (long code) of the control signal other than the first code, which was spread by a specific spreading signal by the base station, is despread by using the same spreading signal.

However, in such prior CDMA system, the control signals are transmitted from base stations at random (or asynchronously), as shown in FIG. 2. Accordingly, there are cases in which the control signals are transmitted from the plural base stations (e.g., BS1 and BS2) at the same time (slot timing "3") with these signals overlapped. Therefore, when the mobile station receives the control signals from the plural base stations BS1 and BS2 simultaneously, the plural first codes are detected, as shown in FIG. 3. In a wireless communication, a signal has been transmitted via a reflection path as well as a direct path. Therefore, three first codes are detected by the matched filter.

It can not be specified from which base station the control signals related to the plural first codes detected are transmitted, based on the matched outputs. Accordingly, it is necessary to despread the remaining portion of the control signal other than the first code with the use of spreading signals of the plural base stations from which there is a possibility that the mobile station receives the control signals with trial-and-error.

This results in an increase in processing time for the reproduction of the control signal, thereby an increase in processing time for "handover" using information included in the control signal from adjacent base stations has been a problem. Thus, in the conventional CDMA system, since the transmission timing of the control signal has been asynchronous or random between base stations, reproducing process have taken time.

BRIEF SUMMARY OF THE INVENTION

Accordingly, it is an object of the present invention to provide a radio communication system or radio communication base station capable of reduction of the processing time for the reproduction of the control signal from the base station.

A related object of the present invention is to provide a control method for transmission timing of the control signal to be transmitted from the base station, by which the mobile station can reduce the processing time for the reproduction of the control signal.

According to the present invention, a transmission timing of the control signal is controlled such that each transmission timing differs between base stations which are adjacently located. Thus, the mobile station can reproduce the control signal using only a predetermined spreading signal for the base station which transmits the control single. Therefore the time for reproducing process of the control signal can be reduced.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Figure 1:
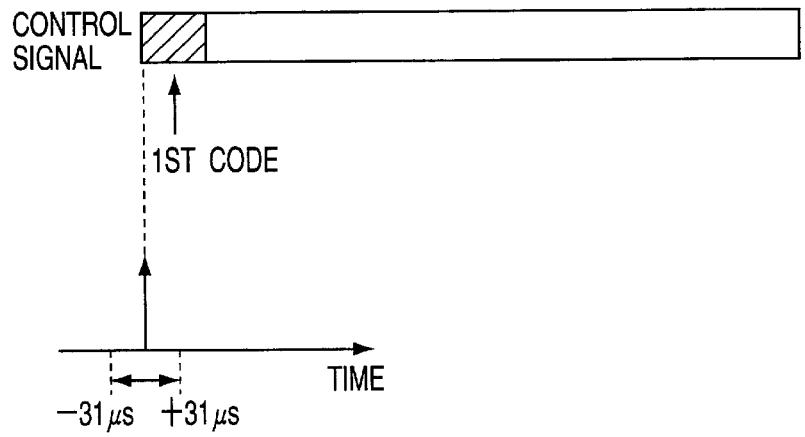
FIG. 1 illustrates a signal format of a control signal including a first code.
Figure 2:
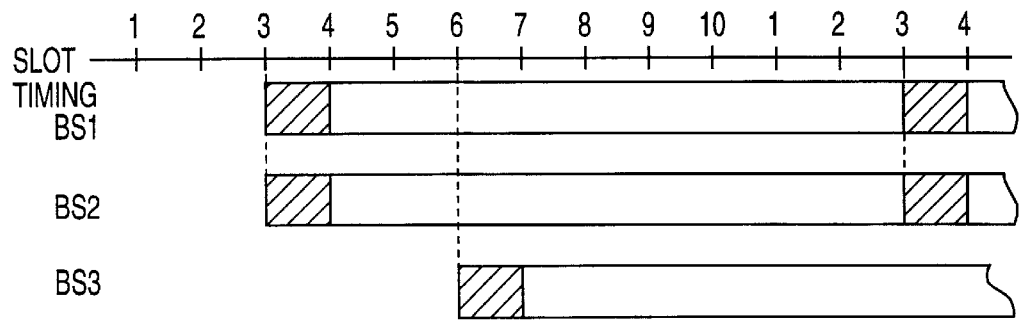
FIG. 2 illustrates a transmission timing of the control signals from base stations in a conventional CDMA system.
Figure 3:
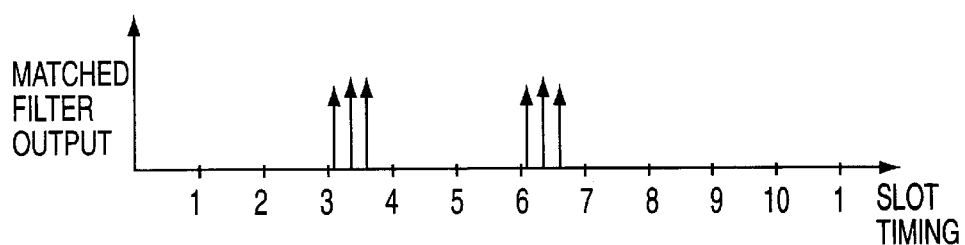
FIG. 3 illustrates matched outputs of the control signal in a mobile station in the conventional system.
Figure 4:
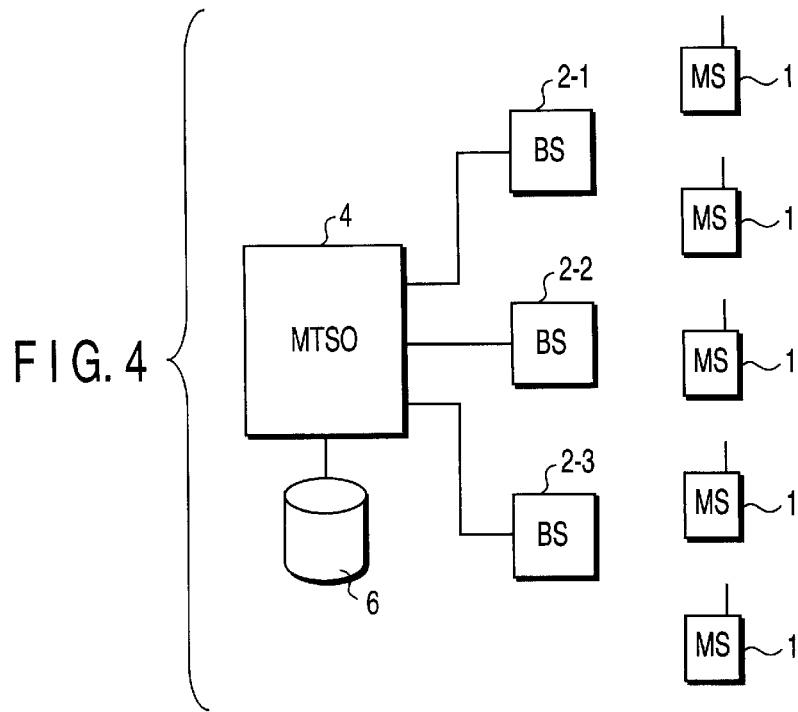
FIG. 4 is a block diagram showing an embodiment of a radio communication system according to the present invention.

An embodiment of a radio communication system according to the present invention will be described in detail with reference to the accompanying drawings. FIG. 4 is the block diagram showing the configuration of the whole system of the embodiment.

The CDMA radio communication system is described as the embodiment, but the present invention is not limited to the CDMA system. In the CDMA system, a plurality of base stations 2-1, 2-2, 2-3, . . . are dispersedly arranged. Each base station covers a radio area of a radius of tens Km. Inherent spreading signal is assigned to each radio area (or each base station).

Mobile stations 1 are connected to the base station 2-1, 2-2, 2-3, . . . via a radio link. The plural base stations 2-1, 2-2, 2-3, . . . are connected to a center station 4 (MTSO; Mobile Telephone Switching Office) managing these base stations. The center station 4 is provided with a storage 6 for storing slot timing information to manage the transmission timing of the control signals from the base stations 2-1, 2-2, 2-3, . . . .

The center station 4 controls the transmission timing of the control signal to be periodically transmitted from each base stations 2-1, 2-2, 2-3, . . . based on the slot timing information of each base station. Thus, each base station 2-1, 2-2, 2-3, . . . transmits the control signal in different timing. Since the number of the slot timings is finite, for example, ten, when the number of the base stations exceeds that of the slot timings, several base stations must transmit the control signals in the same timing. In this case, distant base stations may transmit the control signals in the same timing.

Accordingly, the mobile station 1 receives the control signal from only one base station 2. But, the mobile station 1 does not detect which base station transmits the control signal, based on these information. It can be determined from which base station the received control signal has been transmitted, based on the slot timing detecting the first code. Therefore, the base stations 2-1, 2-2, 2-3, . . . notify all the mobile stations 1 of their slot timing information stored in the storage 6 of the MTSO 4. The slot timing information indicates the relationship between the slot timing and the base station. The mobile station receives the control signal from only one base station 2, and recognizes, based on the slot timing, from which base station 2 the control signal bas been transmitted. The spreading signal using at the time of despread for the remaining portion of the control signal other than the first code can be specified without trial-and-error, and the control signal can be reproduced in a short time. The time for demodulation process to synchronize the mobile station with one of the base stations 2-1, 2-2, 2-3, . . . can be reduced in comparison with the conventional system in which each base station transmits the control signal at random.

Figure 5:
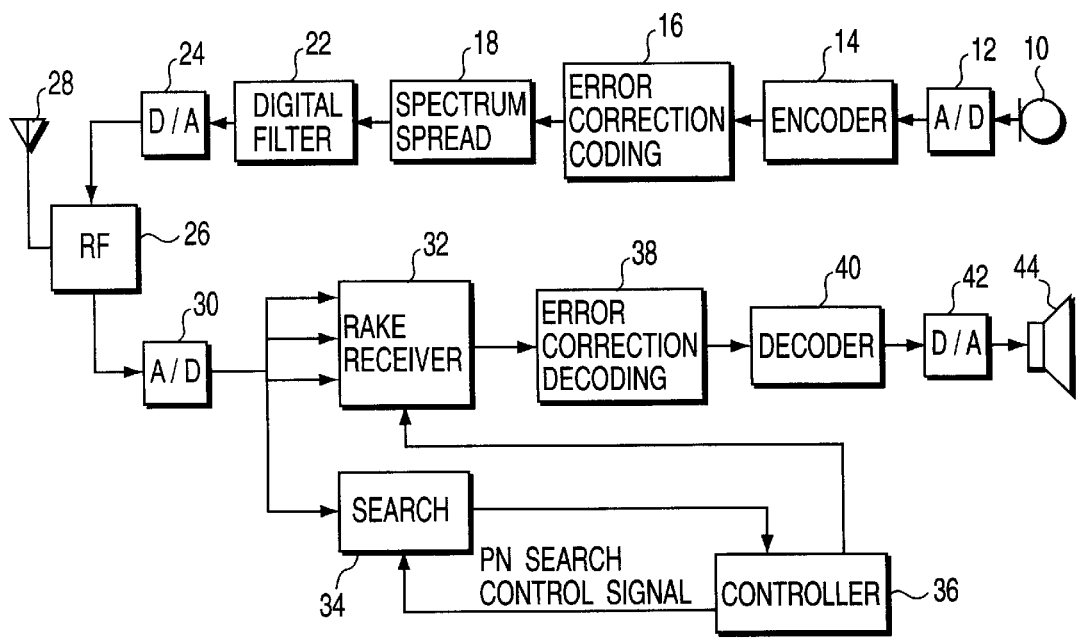
FIG. 5 is a block diagram of a mobile station of the embodiment.

FIG. 5 is the block diagram showing the constitution of the mobile station 1 of the embodiment. A sending speech signal input via a microphone 10 is converted into digital data by an analog-to-digital converter 12 and input into an encoder 14 for speech coding. In the encoder 14, the digital speech data is compression-encoded by a speech coding processing.

Error-detection code and error-correction code are added to the compression-encoded digital data by an error correction coding circuit 16. Output encoded data from the error correction coding circuit 16 is spectrum-spread by a spectrum spreading circuit 18 with the use of pseudo noise (PN) signal which is used as the spreading signal and determined by negotiation with the base station 2 each time the data is spread. A spread encoded data output from the spectrum spreading circuit 18 is converted into an analog signal by a digital-to-analog converter 24 after elimination of unnecessary frequency component by a digital filter 22. This analog signal is converted into a radio frequency signal by an RF circuit 26 and amplified to a predetermined power level to be transmitted via an antenna 28.

On the other hand, a radio signal received by the antenna 28 is amplified by the RF circuit 26 and down-converted into base band (low frequency band) signal. This down-converted signal is converted into digital data at a predetermined sampling frequency by an analog-to-digital converter 30 and input into a RAKE receiver circuit 32 and a search circuit 34.

The RAKE receiver 32 has a plurality of finger circuits and a symbol synthesizer for synthesizing output signals (symbols) from these finger circuits. Each finger circuit despreads each of the multipath signals received at different timings and via plural paths.

The search circuit 34 detects the first code of the control signal. The first code is used to establish synchronization between the base station and the mobile station. The search circuit 34 also despreads the remaining portion of the control signal using the PN signal for that base station which transmits the control signal. The despread signal is supplied to a controller 36.

The controller 36 selects some of the despread signals supplied from the search circuit 34 having a large correlation and supplies timing information related to the selected signals to the RAKE receiver 34.

The RAKE receiver 32 selects predetermined signals from the plurality of multipath signals on the basis of the timing information from the controller 36 to despread each of the selected signals by using each finger circuits. Synthesized outputs of the finger circuits become receiving data after error-correction decoding processing by an error-correction decoder 38. Speech data in the receiving data is speech-decoded by a decoder 40 and then converted into analog signal by a digital-to-analog converter 42 to be output from a speaker 44.

Figure 6:
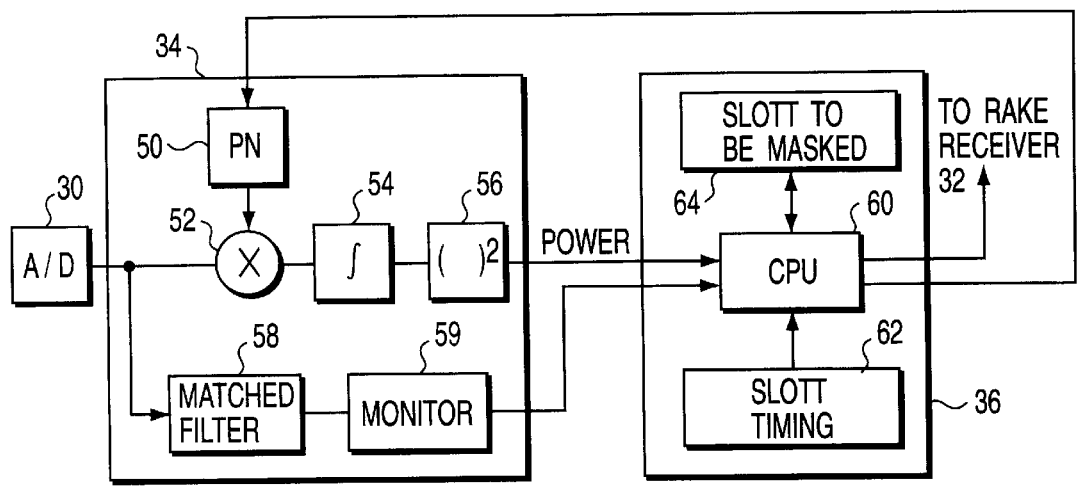
FIG. 6 is a block diagram showing a principal part in the mobile station shown in FIG. 5.

FIG. 6 illustrates a constitution of the search circuit 34 and the controller 36 in detail. Digital data from the analog-to-digital converter 30 is input to a multiplier 52 and a matched filter 58. An output from the matched filter 58 is supplied to a monitor circuit 59.

In the matched filter 58, correlation between the input digital data and the predetermined bit pattern to be included in the first code of the control signal is checked. The matched filter 58 outputs a larger value signal if the correlation is large. Thus, if the predetermined bit pattern exists in the input digital data, the larger value signal is output. The matched output from the matched filter 38 is searched for a predetermined time (a period of 31 μs before and after start of a slot timing). The matched filter 58 outputs plural matched first codes since there are many transmission paths. The monitor circuit 59 selects some of the matched outputs exceeding a predetermined threshold. The selected matched outputs are supplied to a CPU 60. Thus, the CPU 60 detects the start of a series of the multipath reception signals.

The CPU 60 supplies a PN search control signal to a PN generator 50 at a suitable timing to make the PN signal generator 50 generate the PN signal in synchronism with the reception timings of the multipath reception signals. Generated PN signal is multiplied by the output of the analog-to-digital converter 30 by the multiplier 52 to output a depressed control correlation signal. The output of the multiplier 52 is integrated by an integrator 54. The output of the integrator 54 is averaged by an averager 56 to transmit its result as the power of the correlation signal to the CPU 60.

The CPU 60 detects the receiving timings of the multipath signals based on the power of the correlation signal and transmits timing information relative to the plural detected correlation signals to the RAKE receiver circuit 32 in which the following signals are despread. As a result, the multipath control signal is detected. A memory 36 stores the slot timing information stored in the storage 6 of the MTSO 4.

Figure 7:
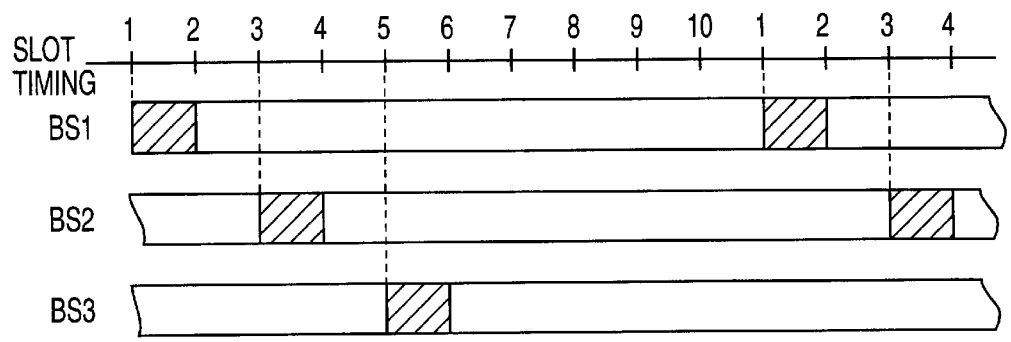
FIG. 7 illustrates transmission timings of control signals from base stations in the embodiment.

FIG. 7 illustrates an example that control signals from base stations 2-1, 2-2, 2-3 are transmitted so that transmission timings of the control signals from those stations are not overlapped. The base stations 2-1, 2-2, 2-3 are respectively assigned with the slot timings "1", "3", and "5".

Figure 8:
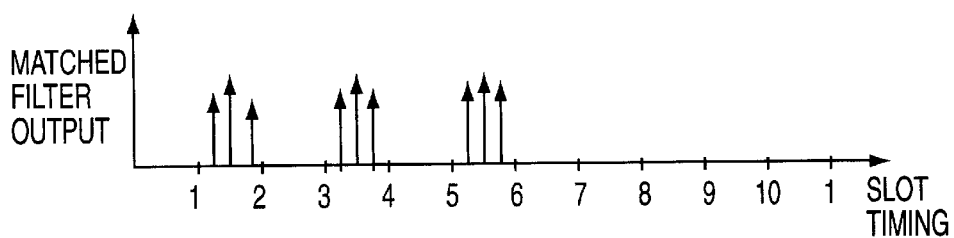
FIG. 8 illustrates matched outputs of the control signal in the mobile station in the embodiment.

FIG. 8 shows matched outputs of the first codes in this case. A receiving start timing of the control signal is specified based on this result.

Since only one base station transmits the control signal at each slot timing, the start of the control signal can be detected by only receiving the first code. Therefore, the reproduction of the control signal becomes possible by only applying one spreading signal to the remaining portion other than the first code in the control signal.

Conventionally, there was a case that the control signals from two or more base stations might be transmitted at the same slot timing. In this case, since it can not be specified from which of the base stations the control signal has been transmitted, based on only detection of the first code, when two or more spreading signals are applied to the remaining portion other than the first code in one control signal, the reproduction of the control signal has become possible for the first time.

This way, in this embodiment, since the transmission timings of the control signals from each of the base stations are different from each other, the processing time for the reproduction of the control signal decreases than the prior art, in its turn causes effect that the processing time for the handover also decreases, and thereby prevention of call interruption by prolonged processing time becomes possible.

Figure 9:
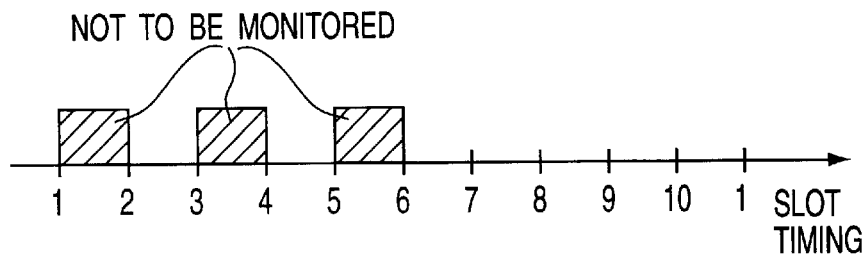
FIG. 9 illustrates an operation of a modification of the embodiment.

In addition, the presence or absence of the control signal from the adjacent base station is decided by periodic detection of the presence or absence of the first code in each slot timing in above-mentioned embodiment. However, as shown in FIG. 9, it is not necessary to monitor the presence or absence of the first code in all the slot timings every time. If the control signal has been already detected at some slot timings (timings "1", "3" and "5"), the monitor of the first code is omitted for that timings. This causes reduction of the detection time for the first code. Such information as to whether the control signal has been already detected at some slot timings is stored in a memory 64.

Figure 10:
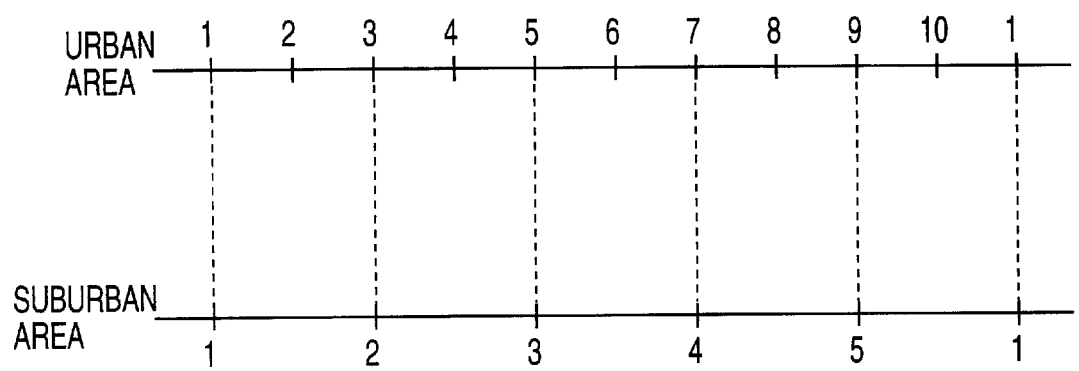
FIG. 10 illustrates an operation of another modification of the embodiment.

In above-mentioned embodiment, the control signals are transmitted in a predetermined cycle for all the service areas. The embodiment is not limited to this case, for example, as shown in FIG. 10, though ten control signals are periodically transmitted in urban area, five control signals may be periodically transmitted in suburban area in view of the fact that time for reflection takes longer than urban area.

In this case, specifically, the center station 4 sets slot timing information in accordance with the area, the base station 2 further comprises means for notifying the set slot timing information to the mobile station 1, and the mobile station 1 stores the notified information to detect the synchronization of the control signal from the base station with the use of the matched filter on the basis of the stored information.

As described above, in the present invention, in a radio communication system, since the center station controls the transmission timing of the control signal to be transmitted from each base station such that the transmission timings are different by base station, time for detecting the receiving timing of the control signal in the mobile station can be shortened, and processing time for the handover can be also shortened.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the radio communication system is not limited to the CDMA system.

What is claimed is:

1. A radio communication system comprising:
   base stations, any one of said base stations being connected to a mobile station via a radio link by means of spectrum spread multiplexing scheme, said one base station and said mobile station being synchronized based on a control signal periodically transmitted from said one base station, the control signal having a first portion which includes a predetermined bit pattern and is not spectrum-spread and a second portion which is spectrum-spread by using a spreading signal assigned to said one base station; and
   a center station configured to control said base stations and store control signal transmission timing information of said base stations such that base stations which are adjacently located transmit the control signal at different timing, wherein
   any one of said base station comprises a transmitter configured to transmit the control signal based on said control signal transmission timing information, and
   said mobile station comprises a detector configured to detect whether or not the first portion of the control signal includes the predetermined bit pattern.

2. The radio communication system according to claim 1, wherein said detector is a matched filter.

3. The radio communication system according to claim 2, wherein
   any one of said base stations informs the mobile station of the control signal transmission timing information stored in said central station;
   said mobile station comprises a memory configured to store the control signal transmission timing information informed by said any base station and a controller configured to control the operation of said matched filter based on the stored control signal transmission timing information.

4. The radio communication system according to claim 3, wherein said mobile station comprises a second memory configured to store a control signal transmission timing at which said matched filter detects that the first portion of the control signal includes the predetermined bit pattern and said controller controls the operation of said matched filter such that the matched filter does not detect whether or not the first portion of the control signal includes the predetermined bit pattern at the control signal transmission timing stored in the second memory.

5. The radio communication system according to claim 1, wherein a period of periodically transmission of the control signal differs based on a location of said base stations.

6. A control method for a radio communication system comprising a mobile station and base stations, any one of the base stations being connected to said mobile station via a radio link, the method comprising:

informing the mobile station of slot timings of each of the base stations, different slot timing being assigned to base stations which are adjacently located;

periodically transmitting a control signal from any one of the base stations to the mobile station at the slot timing assigned to the any one of the base stations, the control signal having a first portion which includes a predetermined bit pattern and is not spectrum-spread and a second portion which is spectrum-spread by using a spreading signal assigned to the base station, whereby the mobile station detects from which base station the control signal has been transmitted, based on a reception slot timing, and despreads the second portion of the control signal by using the spreading signal assigned to the base station which has transmitted the control signal.

7. The method according to claim 6, wherein a period of periodically transmission of the control signal differs based on a location of the base stations.

8. A mobile station of a radio communication system in which any one of base stations periodically transmits a control signal at a predetermined slot timing assigned to the base station, the control signal having a first portion which includes a predetermined bit pattern and is not spectrum-spread and a second portion which is spectrum-spread by using a spreading signal assigned to the base station, comprising:

a control signal receiver configured to receive the control signal and to detect a reception timing of the first portion of the control signal based on the received control signal;

a despread circuit configured to detect from which base station the received control signal has been transmitted, based on the reception timing of the first portion of the control signal and a predetermined slot timing information indicating the slot timings assigned to the base stations, different slot timing being assigned to base stations which are adjacently located, and to spectrum-despread the second portion of the received control signal using the spreading signal assigned to the base station which has transmitted the received control signal.

9. The mobile station according to claim 8, wherein said control signal receiver comprises a matched filter configured to compare the received control signal with the predetermined bit pattern and a monitor circuit configured to select outputs of the matched filter having a value larger than a predetermined value.

10. The mobile station according to claim 8, wherein said despread circuit comprises a search circuit configured to detect reception timings of plural control signals transmitted via plural paths and a RAKE receiver configured to spectrum-despread the plural control signals based on the detected timings.

11. The mobile station according to claim 8, wherein said control signal receiver comprises a memory configured to store slot timing at which the reception timing of the first portion of the control signal is detected and said control signal receiver does not detect the reception timing of the first portion of the control signal at the stored slot timing.

12. The mobile station according to claim 8, wherein the predetermined slot timing information is transmitted from the base station.

13. An article of manufacture comprising a computer usable medium having computer readable program code means embodied therein, the computer readable program code means comprising:

computer readable program code means for causing a base station to periodically transmit a control signal to a mobile station, the control signal having a first portion which includes a predetermined bit pattern and is not spectrum-spread and a second portion which is spectrum-spread by using a spreading signal assigned to each of base stations, a transmission timing of the control signal being controlled such that base stations which are adjacently located transmit the control signal at different timing;

computer readable program code means for causing the mobile station and the base station to synchronize each other based on the control signal;

computer readable program code means for causing a detector included in the mobile station to detect whether or not the first portion of the control signal matches with the predetermined bit pattern.

14. A computer program product configured to control a radio communication system comprising a mobile station and base stations, one of the base station being connected to said mobile station via a radio link, the computer program product storing program instructions for execution on a computer system enabling the computer system to perform:

informing the mobile station of slot timings of the base stations, different slot timings being assigned to base stations which are adjacently located;

periodically transmitting a control signal from one of the base stations to the mobile station at the slot timings assigned to the base station, the control signal having a first portion which includes a predetermined bit pattern and is not spectrum-spread and a second portion which is spectrum-spread by using a spreading signal assigned to the base station, whereby a mobile station detects from which base station the control signal has been transmitted, based on a reception slot timing, and despreads the second portion of the control signal by using the spreading signal assigned to the base station which has transmitted the control signal.

15. An article of manufacture comprising a computer usable medium having computer readable program code means embodied therein, the computer readable program code means controlling a mobile station of a radio communication system in which one of base stations periodically transmits a control signal at a predetermined slot timing assigned to the base station, the control signal having a first portion which includes a predetermined bit pattern and is not spectrum-spread and a second portion which is spectrum-spread by using a spreading signal assigned to the base station, the computer readable program code means comprising:

computer readable program code means for causing a computer to receive the control signal and to detect a reception timing of the first portion of the control signal based on the received control signal;

computer readable program code means for causing a computer to detect from which base station the received control signal has been transmitted, based on the reception timing of the first portion of the control signal and a predetermined slot timing information indicating the slot timings assigned to the base stations, different slot timings being assigned to base stations which are adjacently located, and to spectrum-despread the second portion of the received control signal using the spreading signal assigned to the base station.

* * * * *

UNITED STATES PATENT AND TRADEMARK OFFICE
CERTIFICATE OF CORRECTION

PATENT NO. : 6,782,008 B2
DATED : August 24, 2004
INVENTOR(S) : Saito

It is certified that error appears in the above-identified patent and that said Letters Patent is hereby corrected as shown below:

<u>Title page,</u>
Item [57], ABSTRACT,
Line 5, change "single" to -- signal --.

Signed and Sealed this

Ninth Day of November, 2004

JON W. DUDAS
*Director of the United States Patent and Trademark Office*